(12) United States Patent
Hirayama et al.

(10) Patent No.: US 9,535,240 B2
(45) Date of Patent: Jan. 3, 2017

(54) ZOOM OPTICAL SYSTEM

(71) Applicant: Nikon Corporation, Chiyoda-ku, Tokyo (JP)

(72) Inventors: Yoshikazu Hirayama, Chiba (JP); Miho Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 36 days.

(21) Appl. No.: 14/291,155

(22) Filed: May 30, 2014

(65) Prior Publication Data

US 2014/0268363 A1    Sep. 18, 2014

Related U.S. Application Data

(63) Continuation of application No. PCT/JP2013/000984, filed on Feb. 21, 2013.

(30) Foreign Application Priority Data

Feb. 29, 2012  (JP) .................. 2012-043926

(51) Int. Cl.
*G02B 15/177* (2006.01)
*G02B 15/15* (2006.01)
(Continued)

(52) U.S. Cl.
CPC ............. *G02B 15/177* (2013.01); *G02B 13/04* (2013.01); *G02B 13/18* (2013.01); *G02B 15/15* (2013.01); *G02B 27/4211* (2013.01)

(58) Field of Classification Search
CPC ....... G02B 15/177; G02B 15/14; G02B 15/15; G02B 15/163; G02B 15/167; G02B 13/04; G02B 27/4211
(Continued)

(56) References Cited

U.S. PATENT DOCUMENTS

| 6,081,389 A | 6/2000 | Takayama et al. |
| 6,172,818 B1 | 1/2001 | Sakamoto |

(Continued)

FOREIGN PATENT DOCUMENTS

| EP | 1830204 A1 | 9/2007 |
| EP | 1830205 A1 | 9/2007 |

(Continued)

OTHER PUBLICATIONS

International Search Report from International Patent Application No. PCT/JP2013/000984, May 28, 2013.
(Continued)

*Primary Examiner* — Jordan Schwartz
(74) *Attorney, Agent, or Firm* — Shapiro, Gabor and Rosenberger, PLLC

(57) ABSTRACT

Provided is a zoom optical system which includes, in order from an object, a first lens group having negative refractive power and other lens groups, and in which an interval between each lens group changes upon zooming, wherein the first lens group includes a first negative lens which is disposed closest to the object and has a diffractive optical element on an image side lens surface, and a positive lens disposed closer to the image than the first negative lens, and the glass material used for the positive lens satisfies the following conditions expressions: $\nu 1p \leq 35$ and $\Delta(\theta g, F) \geq 0.007$, where $\nu 1p$ denotes an Abbe number, based on the d-line, of the glass material used for the positive lens of the first lens group, and $\Delta(\theta g, F)$ denotes a deviation of the partial dispersion ratio of the glass material, which is used for the positive lens, from a standard line that connects a glass type A and a glass type B in a graph of which abscissa is an Abbe number $\nu d$ based on the d-line, and the ordinate is the partial dispersion ratio $(\theta g, F) = (ng-nF)/(nF-nC)$, with the Abbe number $\nu d$ and the partial dispersion ratio $(\theta g, F)$ of the glass type A and the glass type B being as follows: Glass type A: $\nu d = 60.49$, $(\theta g, F) = 0.5436$; glass type B: $\nu d = 36.26$, $(\theta g, F) = 0.5828$.

15 Claims, 12 Drawing Sheets

(51) Int. Cl.
*G02B 13/04* (2006.01)
*G02B 13/18* (2006.01)
*G02B 27/42* (2006.01)

(58) Field of Classification Search
USPC .......................................... 359/676, 680–689
See application file for complete search history.

(56) References Cited

U.S. PATENT DOCUMENTS

| | | |
|---|---|---|
| 2002/0196560 A1 | 12/2002 | Endo |
| 2006/0061872 A1 | 3/2006 | Yamasaki |
| 2010/0091170 A1 | 4/2010 | Miyazaki et al. |
| 2010/0238560 A1 | 9/2010 | Fujimoto |
| 2012/0162768 A1* | 6/2012 | Kuzuhara ............ G02B 27/646 359/557 |
| 2013/0194487 A1* | 8/2013 | Eguchi .................. G02B 13/02 348/360 |

FOREIGN PATENT DOCUMENTS

| | | |
|---|---|---|
| JP | 11-052235 A | 2/1999 |
| JP | 11-052237 A | 2/1999 |
| JP | 2000-009999 A | 1/2000 |
| JP | 2000-066092 A | 3/2000 |
| JP | 2000-147380 A | 5/2000 |
| JP | 2002-196236 A | 7/2002 |
| JP | 2003-021783 A | 1/2003 |
| JP | 2004-117826 A | 4/2004 |
| JP | 2006-084971 A | 3/2006 |
| JP | 2009-251117 A | 10/2009 |
| JP | 2010-217535 A | 9/2010 |

OTHER PUBLICATIONS

Written Opinion of the International Searching Authority from International Patent Application No. PCT/JP2013/000984, May 28, 2013.
Office Action issued Nov. 11, 2015, in Chinese Patent Application No. 201380005147.3.

* cited by examiner

*FIG.2*
(EXAMPLE 1)
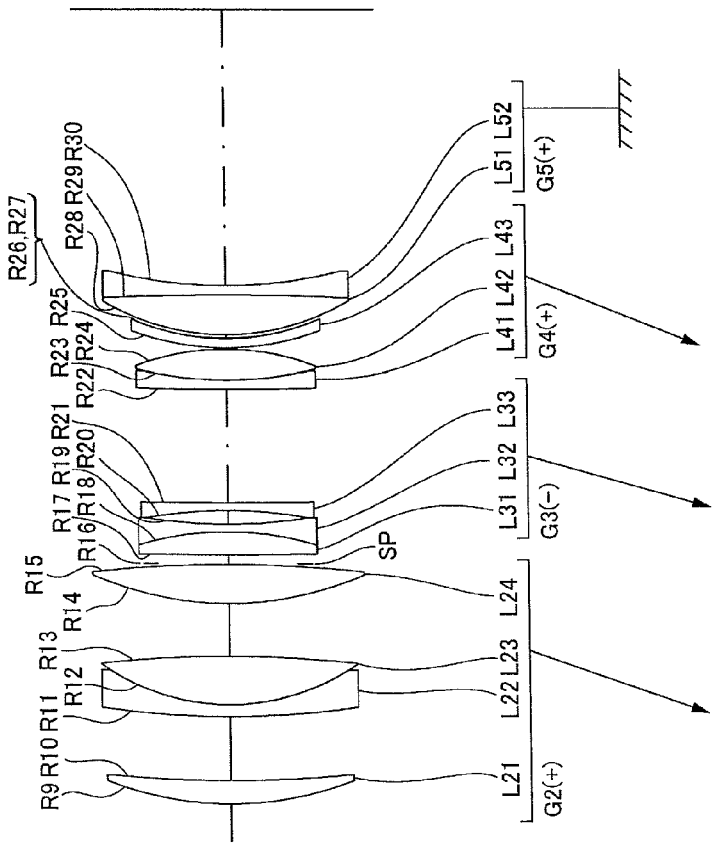
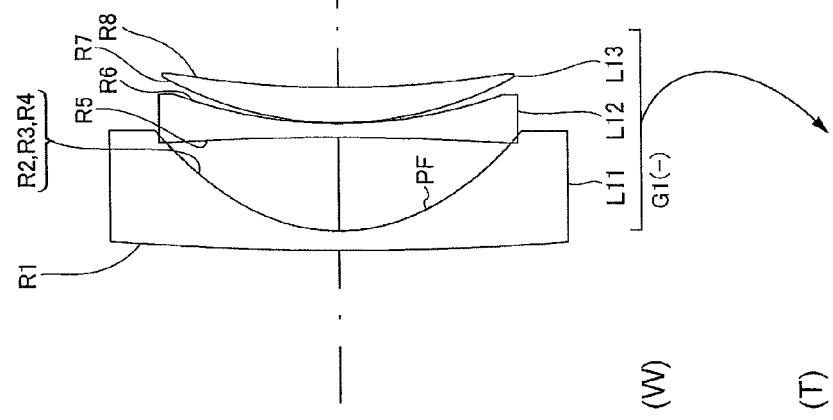

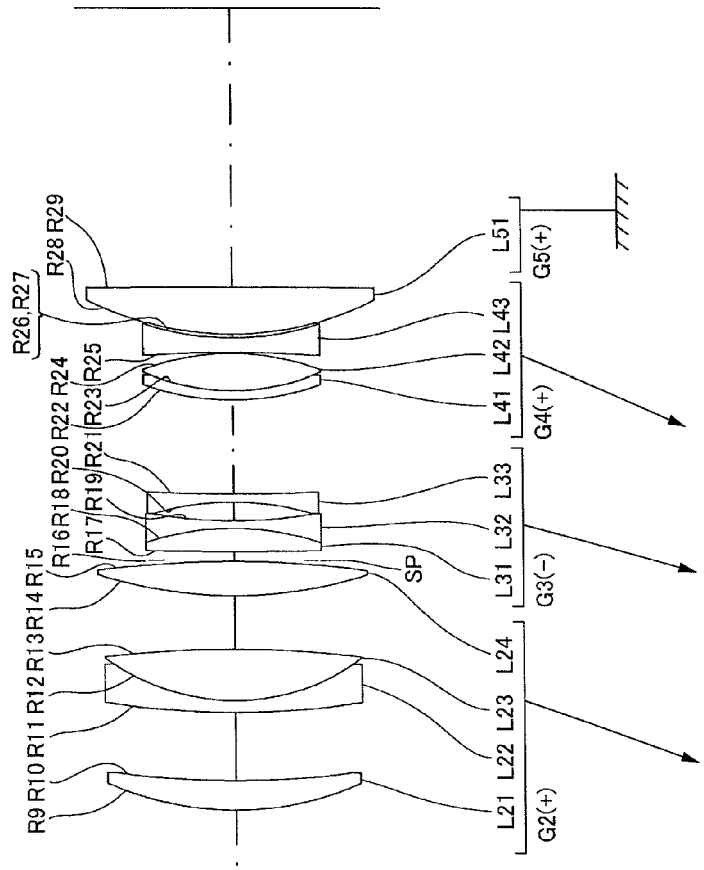
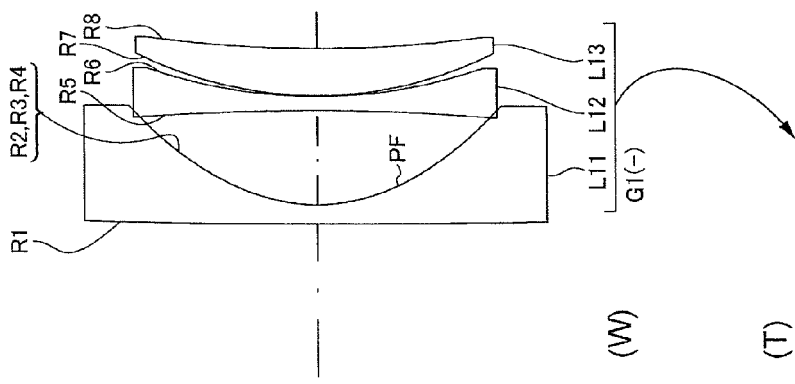
FIG.5
(EXAMPLE 2)

ZOOM OPTICAL SYSTEM

This is a continuation of PCT International Application No. PCT/JP2013/000984, filed on Feb. 21, 2013, which is hereby incorporated by reference. This application also claims the benefit of Japanese Patent Application No. 2012-043926, filed in Japan on Feb. 29, 2012, which is hereby incorporated by reference.

TECHNICAL FIELD

The present invention relates to a zoom optical system using a diffractive optical element.

TECHNICAL BACKGROUND

If a diffractive optical element is used in a zoom optical system, chromatic aberration can be easily corrected and high optical performance can be implemented (e.g. see Patent Document 1).

PRIOR ARTS LIST

Patent Document

Patent Document 1: Japanese Laid-Open Patent Publication No. 2004-117826(A)

SUMMARY OF THE INVENTION

Problems to be Solved by the Invention

Generally it is desirable for an optical system, such as a digital camera and a video camera, to have a total lens length (total optical length, that is, the length from the lens surface closest to the object (first surface) to the image surface) that is short and an entire optical system that is compact. However as the total lens length becomes shorter, various aberrations, including chromatic aberration, tend to increase and optical performance tends to deteriorate. Even if a diffractive optical element alone is installed in such an optical system, it is difficult to correct the chromatic aberration well in the entire zoom range unless the installed position and the refractive power are set appropriately. If a diffractive optical element is used inappropriately, chromatic aberration correction becomes insufficient. If the refractive power of the diffractive optical element is high, the grating pitch of the diffractive optical element becomes small, which makes manufacturing difficult and productivity deteriorates.

With the foregoing in view, it is an object of the present invention to provide a zoom optical system which is compact, corrects various aberrations including chromatic aberration well throughout the entire zoom range, and has high optical performance, by using a diffractive optical element effectively.

Means to Solve the Problem

To achieve this object, an aspect of the present invention provides a zoom optical system which includes, in order from an object, a first lens group having negative refractive power, and other lens groups, and in which an interval between each lens group changes upon zooming. In this zoom optical system, the first lens group includes a first negative lens which is disposed closest to the object and has a diffractive optical element on an image side lens surface, and a positive lens disposed closer to the image than the first negative lens, and a glass material used for the positive lens satisfies the following conditional expressions.

$$\nu 1p \leq 35$$

$$\Delta(\theta g, F) \geq 0.007$$

where $\nu 1p$ denotes an Abbe number, based on the d-line, of the glass material used for the positive lens of the first lens group, and $\Delta(\theta g, F)$ denotes a deviation of the partial dispersion ratio of the glass material, which is used for the positive lens, from a standard line that connects a glass type A and a glass type B in a graph of which abscissa is an Abbe number $\nu d$ based on the d-line, and the ordinate is the partial dispersion ratio $(\theta g, F) = (nG-nF)/(nF-nC)$, with the Abbe number $\nu d$ and the partial dispersion ratio $(\theta g, F)$ of the glass type A and the glass type B being as follows:

Glass type A: $\nu d = 60.49$, $(\theta g, F) = 0.5436$
Glass type B: $\nu d = 36.26$, $(\theta g, F) = 0.5828$

Advantageous Effects of the Invention

According to the present invention, a zoom optical system which is compact, corrects various aberrations including chromatic aberration well throughout the entire zoom range, has high optical performance, and can be provided by using a diffractive optical element effectively.

BRIEF DESCRIPTION OF THE DRAWINGS

FIG. 2 is a cross-sectional view depicting a configuration of a zoom optical system according to Example 1 in a wide-angle end state, and a zoom locus thereof from the wide-angle end state (W) to the telephoto end state (T);

FIG. 5 is a cross-sectional view depicting a configuration of a zoom optical system according to Example 2 in the wide-angle end state, and a zoom locus thereof from the wide-angle end state (W) to the telephoto end state (T);

DESCRIPTION OF THE EMBODIMENTS

Figure 1:
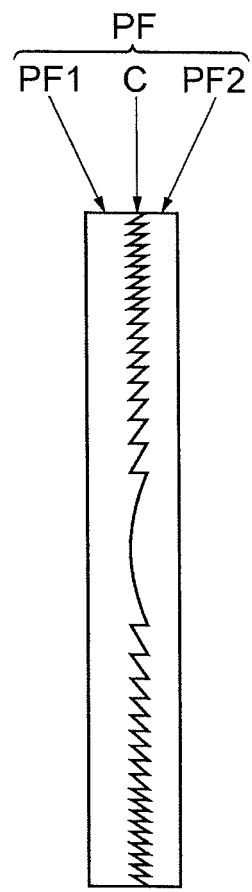
FIG. 1 is a schematic diagram depicting a diffractive optical element according to the present embodiment.

Embodiments of the present invention will now be described with reference to the drawings. As illustrated in FIG. 1, a diffractive optical element PF used for a zoom optical system according to this embodiment uses a so called "close-contact multi-layer type diffractive optical element PF" having two diffractive element members made of different optical materials, which are, in concrete terms, a first diffractive optical element PF1 having a first diffractive optical surface on which a plurality of grating grooves are formed, and a second diffractive optical element PF2 having a second diffractive optical surface on which a plurality of grating grooves are formed, where the first diffractive optical element PF1 and the second diffractive optical element PF2 are disposed so that the first diffractive optical surface and the second diffractive optical surface face each other, and the first diffractive optical surface and the second diffractive optical surface are closely contacted with each other at the diffractive optical surface C.

As illustrated in FIG. 2, the zoom optical system ZL according to this embodiment has, in order from an object, a first lens group G1 having negative refractive power, a second lens group G2 having positive refractive power, a third lens group G3 having negative refractive power, a fourth lens group G4 having positive refractive power, and a fifth lens group G5 having positive refractive power, where an interval between each lens group changes upon zooming from the wide-angle end state to the telephoto end state, and the first lens group G1 has at least one close-contact multi-layer type diffractive optical element PF.

Compactness of the zoom optical system ZL is implemented by changing the interval between each lens group G1 to G5 upon zooming from the wide-angle end state to the telephoto end state. Further, chromatic aberration is effectively corrected by disposing the close-contact multi-layer type diffractive optical element PF in the first lens group G1, where large longitudinal chromatic aberration is generated.

In the later mentioned Example 1, chromatic aberration is corrected well throughout the entire zoom range by disposing a close-contact multi-layer type diffractive optical element PF in the first lens group G1. This is the same for Example 2 and Example 3.

The first lens group G1 includes, in order from the object, a first negative lens L11, a second negative lens L12 and a positive lens L13, where the first negative lens L11 has a meniscus form having a convex surface facing the object, the second negative lens L12 has a biconcave lens form, and the positive lens L13 has a meniscus form having a convex surface facing the object. The close-contact multi-layer type diffractive optical element PF is disposed on an image side lens surface (Surface 2) of the first negative lens L11, and this surface is preferably aspherical. According to this configuration, aberrations can be corrected well throughout the entire zoom range.

In the zoom optical system ZL according to this embodiment, it is preferable to satisfy the following conditional expressions (1) and (2).

$$\nu 1p \leq 35 \quad (1)$$

$$\Delta(\theta g, F) \geq 0.007 \quad (2)$$

where ν1p denotes an Abbe number, based on the d-line, of the glass material used for the positive lens L13 of the first lens group G1, and Δ(θg, F) denotes a deviation of the partial dispersion ratio of the glass material used for the positive lens L13 of the first lens group G1 from a standard line that connects a glass type A (NSL7: Ohara Inc.) and a glass type B (PBM2: Ohara Inc.) in a graph of which abscissa is an Abbe number νd based on the d-line, and the ordinate is the partial dispersion ratio (θg, F)=(ng−nF)/(nF−nC) (see FIG. 11). νd here is an Abbe number with respect to the d-line, and ng, nF and nC are refractive indices of the g-line, F-line and C-line of the Fraunhofer lines respectively.

By using glass material that satisfies the conditional expressions (1) and (2) for the positive lens L3 constituting the first lens group G1, the longitudinal chromatic aberration and the lateral chromatic aberration can be corrected well.

In the zoom optical system ZL according to this embodiment, it is preferable that the following conditional expression (3) is satisfied.

$$40.0 \leq \nu 1 dave \leq 55.0 \quad (3)$$

where ν1dave denotes an average value of Abbe numbers based on the d-line of glass materials of all the lenses constituting the first lens group G1, excluding the diffractive optical element PF, lenses made of glass material of which absolute value of the refractive power is 1/5000 or less, and lenses made of anomalous dispersion glass of which Abbe number is greater than 70.

The conditional expression (3) specifies an average value of the Abbe numbers of the glass materials used for the refraction type lenses of the first lens group G1, excluding the diffractive optical element PF, the lenses made of a glass material of which absolute value of the refractive power is 1/5000 or less, and the lenses made of anomalous dispersion glass of which Abbe number is greater than 70.

The diffractive optical element PF includes a diffractive optical surface C (see FIG. 1) where a grating structure of fine grooves or slits (several to several hundred grooves or slits per mm) are concentrically formed, and has a characteristic to diffract the light, that enters the diffractive optical surface C, to a direction determined by the grating pitch (interval of the grating grooves) and the wavelength of the incident light. The diffractive optical element PF is used for a lens that collects the diffracted light of a specific order to one point, for example.

In the refraction type lens made of ordinary optical glass, the refractive power characteristic changes more as the wavelength decreases, but in the case of the diffractive optical element PF, the refractive power characteristic changes linearly with respect to the wavelength. Moreover, the refractive index characteristic of the refraction type lens changes depending on the glass material, but the refractive index characteristic of the diffractive optical element PF does not change depending on the glass material. Therefore if a plurality of refraction type lenses are combined so that the refractive power changes linearly with respect to the wavelength, and the diffractive optical element PF is combined with these refraction type lenses, then a major achromatic effect is acquired and chromatic aberration can be corrected well.

The conditional expression (3) specifies an average value of the Abbe numbers in order to select the glass material of a plurality of refraction type lenses, so that the refractive power linearly changes with respect to the wavelength. If the lower limit value of the conditional expression (3) is not reached, the refractive power characteristic of the refraction type lens changes more as the wavelength decreases, and residual aberration increases if the diffractive optical element PF is combined with this lens. Furthermore, the refractive power of the combined diffractive optical element PF increases and the pitch thereof becomes small, therefore manufacturing becomes difficult and mass producibility deteriorates.

If the upper limit value of the conditional expression (3) is exceeded, on the other hand, a glass material with a high specific gravity is required since a glass material with high anomalous dispersibility is used for the refraction type lens, therefore the weight of the optical system increases. Furthermore, correction of spherical aberration or the like becomes difficult since these glass materials generally have a low refractive index. Spherical Aberration could be corrected by using an aspherical surface, but if the correction amount on the aspherical surface increases, the amount of sag (amount of deviation of the aspherical surface from the spherical surface) increases, which results in manufacturing becoming difficult and mass producibility deteriorates.

To demonstrate the effect of this embodiment with certainty, it is preferable that the lower limit value of the conditional expression (3) is 43.0. And to further demonstrate the effect of the embodiment, it is preferable that the upper limit value of the conditional expression (3) is 51.0.

In the zoom optical system ZL according to this embodiment, it is preferable that only the third lens group G3, out of the first lens group G1 to the fifth lens group G5, includes a lens made of high refractive index glass of which refractive index, with respect to d-line, is higher than 1.8 (lens with high specific gravity). According to this configuration, lenses other than the third lens group G3, that is the first lens group G1, the second lens group G2, the fourth lens group G4 and the fifth lens group G5, are constituted by lenses with a low specific gravity, hence the entire optical system can be lighter without generating longitudinal chromatic aberration and the lateral chromatic aberration.

In the zoom optical system ZL according to this embodiment, it is preferable to satisfy the following conditional expression (4) on the assumption that the surface on which the diffractive optical element PF is installed (that is, the image side lens surface of the first negative lens L11 constituting the first lens group G1) is aspherical.

$$fDOE < -7000 \quad (4)$$

where fDOE denotes a focal length (mm) of the diffractive optical element PF.

The conditional expression (4) specifies the refractive power of the diffractive optical element PF. The refractive power of the element can be weakened by combining the aspherical surface and the diffractive optical element PF that satisfies the conditional expression (4), hence an appropriate grating pitch can be secured, which contributes to the prevention of flares. If the lower limit value of the conditional expression (4) is not reached, the refractive power of the diffractive optical element PF becomes stronger and the grating pitch of the element becomes small, therefore manufacturing becomes difficult and mass producibility deteriorates.

In the zoom optical system ZL according to this embodiment, it is preferable to satisfy the following conditional expression (5).

$$0.001 \le |\phi doei/\phi i| \le 0.010 \quad (5)$$

where $\phi i$ denotes the refractive power of the entire first lens group G1 including the diffractive optical element PF, and $\phi doei$ denotes the refractive power of the diffractive optical element PF.

The conditional expression (5) specifies the ratio of the refractive power of the diffractive optical element PF and the refractive power of the lens group including the diffractive optical element PF, that is, the first lens group G1. If the lower limit value of the conditional expression (5) is not reached, the refractive power of the diffractive optical element PF becomes small, and the chromatic aberration correction becomes insufficient. If the upper limit value of the conditional expression (5) is exceeded, on the other hand, the refractive power of the diffractive optical element PF becomes stronger, and the grating pitch of the diffractive optical element PF becomes small, therefore manufacturing becomes difficult and mass producibility deteriorates.

To demonstrate the effect of this embodiment with certainty, it is preferable that the lower limit value of the conditional expression (5) is 0.004. And to further demonstrate the effect of this embodiment, it is preferable that the upper limit value of the conditional expression (5) is 0.006.

In the zoom optical system ZL according to this embodiment, it is preferable to satisfy the following conditional expression (6).

$$3.0 \le |TK/fw| \le 4.0 \quad (6)$$

where TK denotes a minimum value of the distance from the exit pupil of the optical system to the image plane which changes upon zooming, and fw denotes a focal length of the zoom optical system in a wide-angle end state.

The conditional expression (6) specifies the ratio of the minimum value of the distance from the exit pupil of the optical system to the image plane which changes upon zooming, and the focal length of the zoom optical system in a wide-angle end state. If the lower limit value of the conditional expression (6) is not reached, securing the mirror operation space becomes difficult when the zoom optical system is used as an interchangeable lens of a single-lens reflex camera, or shading is generated because the beam that enters the picture element inclines near the angle of view. If the upper limit value of the conditional expression (6) is exceeded, on the other hand, miniaturization becomes insufficient.

To demonstrate the effect of this embodiment with certainty, it is preferable that the lower limit value of the conditional expression (6) is 3.5. And to further demonstrate the effect of the embodiment, it is preferable that the lower limit value of the conditional expression (6) is 3.6.

In the zoom optical system ZL according to this embodiment, the fifth lens group G5 may be constituted by at least one positive lens, but it is preferable to add at least one negative lens thereto. If at least one positive lens and at least one negative lens are included in the configuration, the generation of a longitudinal chromatic aberration can be suppressed while controlling aspherical aberration, coma aberration, astigmatism, curvature of field or the like.

In the zoom optical system ZL according to this embodiment, it is preferable to satisfy the following conditional expression (7).

$$0.040 \le Pmin \le 0.500 \quad (7)$$

where Pmin denotes a minimum pitch (mm) of the diffractive optical element PF.

The conditional expression (7) specifies the minimum pitch of the grating of the diffractive optical element PF. If the lower limit value of the conditional expression (7) is not reached, the grating pitch becomes small, therefore manufacturing becomes difficult and mass producibility deteriorates. If the upper limit value of the conditional expression (7) is exceeded, on the other hand, the refractive power of the diffractive optical element PF becomes small, and chromatic aberration correction becomes insufficient.

To demonstrate the effect of this embodiment with certainty, it is preferable that the lower limit value of the conditional expression (7) is 0.05.

In the zoom optical system ZL according to this embodiment, it is preferable that the first lens group G1 includes at least one positive lens, and a normal dispersion glass is used as the glass material thereof. By combining this positive lens and the diffractive optical element PF, the generation of longitudinal chromatic aberration and lateral chromatic aberration can be suppressed.

Figure 11:
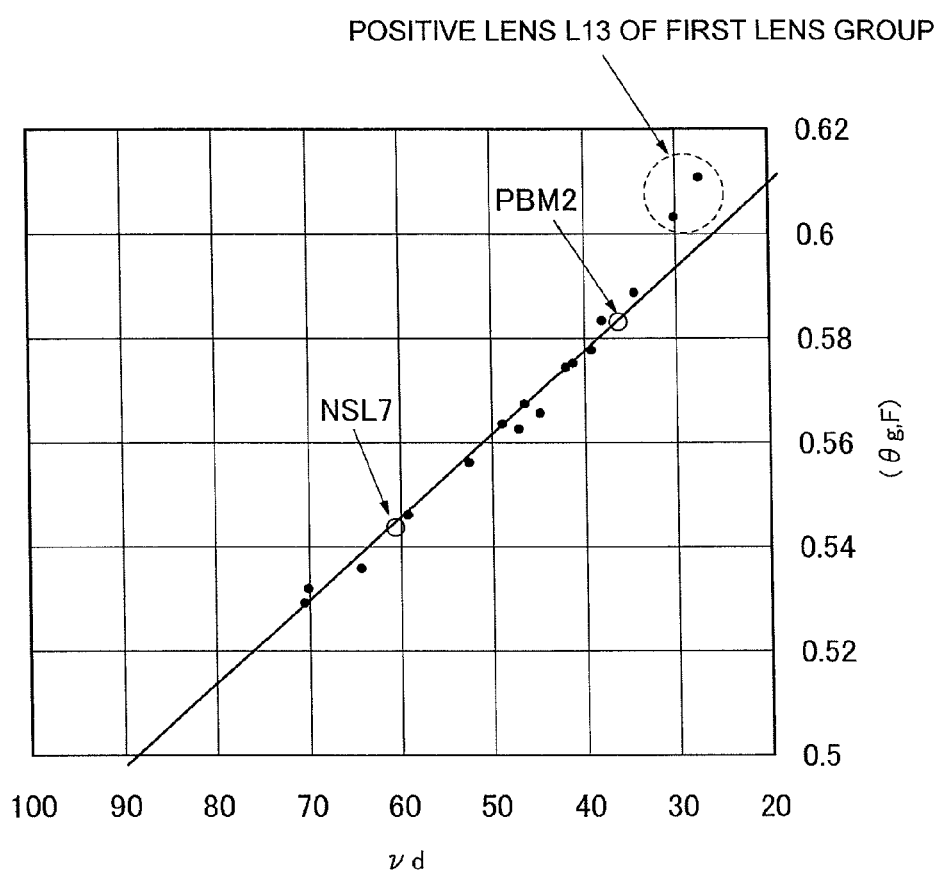
FIG. 11 is a graph for explaining the definition of an anomalous dispersion graph, where the abscissa is an Abbe number $\nu d$ based on the d-line, and the ordinate is a partial dispersion ratio $(\theta g, F)$.

Generally in most optical glasses, a substantially linear relationship is established between the partial dispersion ratio and the Abbe number, as shown in FIG. 11, where the ordinate is the partial dispersion ratio (θg, F) and the abscissa is the Abbe number vd based on the d-line, and this type of glass is called "normal dispersion glass". A type of glass that departs from this linear relationship, on the other hand, is called "anomalous dispersion glass". In concrete terms, if the line connecting NSL7 and PBM2 (both glasses by Ohara Inc.), which are standard normal dispersion glasses, is regarded as a standard line, and deviation of the partial dispersion ratio from this standard line is regarded as $\Delta(\theta g, F)$, then a glass that satisfies the following conditional expression (8) or (9) is defined as an anomalous dispersion glass. Glass type A specified in the Claims corresponds to NSL7, and glass type B corresponds to PBM2.

$$\Delta(\theta g, F) < -0.012 \tag{8}$$

$$\Delta(\theta g, F) > 0.012 \tag{9}$$

The partial dispersion ratio (θg, F) is defined as (θg, F)=(ng−nF)/(nF−nC), where ng denotes a refractive index of the lens material with respect to the g-line (wavelength λ=435.835 nm) nF denotes a refractive index of the lens material with respect to the F-line (wavelength λ=486.133 nm), and nC denotes a refractive index of the lens material with respect to the C-line (wavelength λ=656.273 nm). In the case of NSL7, which is a standard normal dispersion glass, the partial dispersion ratio is 0.5436 and the Abbe number is 60.49, and in the case of PBM2, which is also a standard normal dispersion glass, the partial dispersion ratio is 0.5828 and the Abbe number is 36.26.

In the zoom optical system ZL according to this embodiment, it is preferable that the second lens group G2 includes at least one aspherical surface. According to this configuration, spherical aberration and coma aberration can be corrected well.

In the zoom optical system ZL according to this embodiment, it is preferable that the fourth lens group G4 includes at least one aspherical surface. According to this configuration, spherical aberration and coma aberration can be corrected well.

As described above, the diffractive optical element PF according to this embodiment is classified as a multi-layer type (or laminated type) diffractive optical element, which has a first diffractive optical element PF1 having a first diffractive optical surface and a second diffractive optical element PF2 having a second diffractive optical surface, where the first diffractive optical element PF1 and the second diffractive optical element PF2 are disposed so that the first diffractive optical surface and the second diffractive optical surface face each other, therefore diffraction efficiency can be increased in a wide wavelength region, from the g-line (wavelength λ=435.835 nm) to the C-line (wavelength λ=635.273 nm). As a result, the zoom optical system ZL according to this embodiment using this diffractive optical element PF can be used in a wide wavelength region.

According to this embodiment, if a first order diffracted light is used in a transmission type diffractive optical element PF, the diffraction efficiency indicates a ratio η between the intensity of the incident light I0 and the intensity of the first order diffracted light I1 (η=I1/I0×100 [%]).

In the diffractive optical element PF used for the zoom optical system ZL according to this embodiment, the first diffracted optical surface and the second diffracted optical surface, which are disposed to face each other, as mentioned above, may contact with each other. In other words, the diffractive optical element PF may be constructed as a close-contact multi-layer type diffractive optical element by closely contacting the grating grooves formed on the two diffracted element members respectively. Compared with a separated multi-layer type diffractive optical element where the two diffractive element members, on which grating grooves are formed, are disposed in proximity to each other so that the grating grooves face each other, the manufacturing steps can be simplified in the case of the close-contact multi-layer type diffractive optical element, which means that mass production efficiency is high, and diffraction efficiency with respect to the incident angle of the light beam is good (90% or more in a wide wavelength region, including from g-line to C-line). Therefore the zoom optical system ZL of this embodiment, which uses the close-contact multi-layer type diffractive optical element is manufactured more easily and has good diffraction efficiency.

In the zoom optical system ZL according to this embodiment, at least one of the first diffractive optical element PF1 and the second diffractive optical element PF2 constituting the diffractive optical element PF may be made of UV curable resin. By this configuration, the mass producibility and productivity of the diffractive optical element PF can be increased. As a consequence, the mass producibility and productivity of the zoom optical system ZL according to this embodiment using this diffractive optical element PF can be improved.

To be more specific, as materials of the two diffractive element members, standard glass, thereto-plastic resin or thermo-setting resin that can be injection-molded is used for one of the members, and UV curable resin is used for the other one of the members, whereby the diffractive optical element PF is manufactured. For example, in the case of using glass for one of the members, the diffractive optical surface C is formed by cutting and polishing. Then the UV curable resin is dripped onto the diffractive optical surface C, and is cured by irradiating the ultraviolet rays. In the case of using thermo-plastic rein or thermo-setting resin for the other one of the members, the diffractive optical surface C is formed by injection molding using a die in which grating grooves are formed. Then UV curable resin is dripped onto this diffractive optical surface C, and is cured by irradiating ultraviolet rays. Since such a manufacturing method can be used, which means that it is unnecessary to create diffractive optical surfaces C for two diffractive element members separately and align these diffractive optical surface C, productivity and mass producibility of the diffractive optical element PF can be improved.

In the zoom optical system ZL according to this embodiment, the first diffractive optical element PF1 and the second diffractive optical element PF2 constituting the diffractive optical element PF may be made of UV curable resins having mutually different optical characteristics respectively. By this configuration, the mass producibility and productivity of the diffractive optical element PF can be improved. As a consequence, the mass producibility and productivity of the zoom optical system ZL according to this embodiment using this diffractive optical element PF can be improved.

In this case, one diffractive element member having the diffractive optical surface C is formed first by pressing a die where grating grooves are formed on one of the UV curable resins dripped onto the substrate, and irradiating ultraviolet rays in a direction the opposite of the die. Then the die is removed and the other UV curable resin is dripped onto the diffractive optical surface C cured by the irradiation of the ultraviolet rays. Then the other UV curable resin dripped here is cured by irradiating ultraviolet rays, whereby the other diffractive element member is formed. By using this manufacturing method, the grating grooves can be formed by only one die, and it is unnecessary to create the diffractive optical surfaces C for the two diffractive element members separately and align these diffractive optical surfaces. This means that it is sufficient to perform an operation to drip and cure the UV curable resin twice to manufacture the diffractive optical element PF. Therefore mass producibility and productivity of the diffractive optical element PF can be further improved.

In the zoom optical system ZL according to this embodiment, it is preferable that the following expressions (10) to (13) are satisfied, where nd1, nF1 and nC1 denote refractive indices of the material of one diffractive element member having a lower refractive index and higher dispersion, out of the two diffractive element members constituting the diffractive optical element PF with respect to the d-line (wavelength: 587.562 nm), the F-line (wavelength: 486.133 nm) and the C-line (wavelength: 656.273 nm), and nd2, nF2 and nC2 denotes refractive indices of the material of the other diffractive element member having a higher refractive index and lower dispersion with respect to the d-line, the F-line and the C-line.

$$nd1 \leq 1.54 \quad (10)$$

$$0.0145 \leq nF1 - nC1 \quad (11)$$

$$1.55 \leq nd2 \quad (12)$$

$$nF2 - nC2 \leq 0.013 \quad (13)$$

The conditional expressions (10) to (13) specify the refractive indices of the optical materials used for the two different diffractive element members constituting the diffractive optical element PF of the zoom optical system ZL, that is, the two different resins, with respect to the d-line, and the refractive index difference (nF−nC) with respect to the F-line and the C-line. To be more specific, the conditional expressions (10) to (13) specify the optical characteristics to be satisfied, after being cured to manufacture the diffractive optical element PF, of the two different resins used for the diffractive optical element PF, that is, the resin having a relatively lower refractive index and higher dispersion, and the resin having a relatively higher refractive index and lower dispersion.

By satisfying the conditional expressions (10) to (13), the diffractive optical surface C with higher performance can be formed by closely bonding two different diffractive element members. As a result, 90% or higher diffraction efficiency can be implemented throughout a wide wavelength region from the g-line to the C-line. If the upper limit values are exceeded or if the lower limit values are not reached in the conditional expressions (10) to (13), however, it becomes difficult to implement 90% or higher diffraction efficiency in the wide wavelength region, which makes it difficult to maintain the advantages of the close-contact multi-layer type diffractive optical element PF. The diffraction efficiency here refers to the ratio of the intensity of the incident light and the intensity of the first order diffracted light, as mentioned above.

To be certain, the expressions to determine the diffraction efficiency are shown here. The diffraction efficiency can be expressed by the following expressions (14) and (15), where m is the order of diffraction, η denotes the diffraction efficiency of the diffracted light of the m-th order, d1 denotes the height of the diffraction grating of one diffractive element member forming the diffractive optical surface C, d2 denotes the height of the diffraction rating of the other diffractive element member forming the diffractive optical surface C, n1 denotes the refractive index of one diffractive element member forming the diffractive optical surface C, n2 denotes the refractive index of the other diffractive element member forming the diffractive optical surface C, and λ denotes the wavelength.

$$\eta m = \{\sin(a-m)\pi/(a-m)\pi\}^2 \quad (14)$$

$$a = \{(n1-1)d1 - (n2-1)d2\}/\lambda \quad (15)$$

The resins that satisfy these conditions and a manufacturing method of the close-contact multi-layer type diffractive optical element PF using these resins are disclosed, for example, in European Laid-Open Patent Publication Nos. 1830204(A1) and 1830205(A1).

In this embodiment, the close-contact multi-layer type diffractive optical element PF constituted by the two different UV curable resins is used in each example described later, where the height of the diffraction grating is 20.05 μm, the first order diffraction efficiency is 98% at the g-line (wavelength λ=435.835 nm), 98% at the F-line (wavelength λ=486.133 nm), 100% at the d-line (wavelength λ=587.562 nm) and 98% at the C-line (wavelength λ=656.273 nm).

Figure 12:
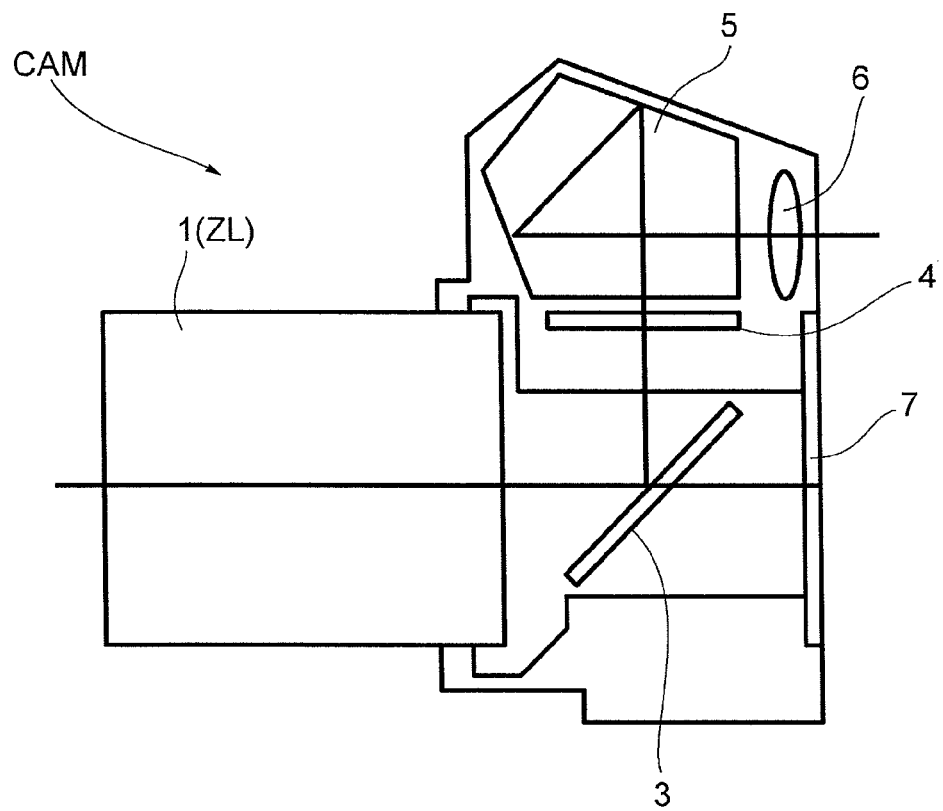
FIG. 12 is a schematic cross-sectional view depicting a configuration of a digital single lens reflex camera (imaging apparatus) using the zoom optical system according to this embodiment.

FIG. 12 shows a schematic cross-sectional view of a digital single lens reflex camera CAM (imaging apparatus) including the above mentioned zoom optical system ZL as an imaging lens 1. In the camera CAM, light from an object (not illustrated) is collected by the imaging lens 1, and forms an image on a focal point plate 4 via a quick return mirror 3. The light that formed an image on the focal point plate 4 is reflected more than once in a penta prism 5, and is guided to an eyepiece 6. Thereby the user can observe the object image as an upright image through the eyepiece 6.

If the user presses a release button (not illustrated), the quick return mirror 3 is retracted from the optical path, and the light from the object (not illustrated) collected by the imaging lens 1 forms an image of the object on a picture element 7. Thereby the light from the object is imaged by the picture element 7, and is recorded as an object image in a memory (not illustrated). In this way, the user can photography the object using the camera CAM.

The camera CAM may hold a detachable imaging lens 1 or may be integrated with the imaging lens 1. The camera CAM may be a single lens reflex camera or may be a compact camera without a quick return mirror.

As the later mentioned examples show, the zoom optical system ZL according to this embodiment, that is mounted on the camera CAM as the imaging lens 1, is compact, corrects various aberrations including chromatic aberration well throughout the entire zoom range, and has high optical performance because of the characteristic lens configuration thereof. This means that the camera CAM can implement an imaging apparatus that is compact, corrects various aberrations including chromatic aberration well throughout the entire zoom range, and has high optical performance.

EXAMPLES

Each example of the zoom optical system according to this embodiment will now be described with reference to the drawings. Table 1 to Table 3 shown below list the data of each lens of Example 1 to Example 3.

In [General Data] in each table, f denotes a focal length (mm) of the zoom optical system ZL at the d-line in the wide-angle end state and the telephoto end state, FNo denotes an F number in the wide-angle end state and the telephoto end state, Y denotes an image height, and Σd denotes a distance on the optical axis from a lens surface (Surface 1) closest to the object to the lens surface closest to the image of the zoom optical system ZL.

In [Lens Data] in each table, the surface number is the sequential number of the lens surface counted from the object side in the light traveling direction, R denotes the radius of curvature of each lens surface, d denotes a distance from each optical surface to the next optical surface (or image plane) on the optical axis, nd denotes a refractive index at the d-line (wavelength: 587.562 nm) of the glass material used for the lens, vd denotes an Abbe number of the glass material used for the lens at the d-line, Di (variable) denotes a variable distance of surface i to the next lens surface, *a denotes an aspherical surface, *d denotes a diffractive optical surface, *s denotes a stop, and "∞" in the radius of curvature R denotes a plane. In the table, the refractive index (d-line) of air "1.000000" is omitted.

In [Aspherical Data] in each table, a shape of the aspherical surface shown with *a in [Lens Data] is indicated by the following Expression (a). Here h denotes a height in a direction perpendicular to the optical axis, Z(h) denotes displacement (sag) in the optical axis direction at height h, c denotes a radius of curvature (paraxial radius of curvature) of the reference spherical surface, K denotes a conical coefficient, and Ai denotes an aspherical coefficient of the i-th order. "E-n" indicates "×10$^{-n}$", and for example, "1.234E-05" means "1.234×10$^{-5}$".

$$Z(h)=ch^2/[1+\{1-(1+\kappa)c^2h^2\}^{1/2}]+A4xy^4+A6xy^6+A8x\\y^8+A10xy^{10}+A12xy^{12} \quad (a)$$

In [Diffractive Optical Surface Data] in each table, the shape of the diffractive optical surface shown in [Lens Data] is indicated by the following Expression (b). Here h denotes height in the direction perpendicular to the optical axis, φ(h) denotes a phase function of the diffractive optical element, λ denotes a wavelength of the incident light, and Ci denotes the phase difference coefficient of the i-th order.

$$\phi(h)=(2\pi/\lambda)\cdot(C2h^2+C4h^4+C6h^6+C8h^8+C10h^{10}) \quad (b)$$

In [Each Group Distance Data] in each table, a variable distance Di of surface i to the next lens surface (i is an integer) is shown in the wide-angle end state and the telephoto end state.

In [Zoom Optical System Group Data] in each table, G denotes a group number, "First surface of group" indicates a surface number of the surface closest to the object in each lens group, and "Group focal length" indicates a focal length of each lens group.

In [Conditional Expression] in each table, a value corresponding to each conditional expression (1) to (7) is shown.

In each table, "mm" is normally used as the unit of focal length f, radius of curvature R, surface distance d and other lengths, but unit is not limited to "mm", but another appropriate unit may be used since an equivalent optical performance is obtained even if the optical system is proportionally expanded or proportionally reduced.

Example 1

Example 1 will be described with reference to FIG. 2 to FIG. 4 and Table 1. FIG. 2 shows a cross-sectional view depicting the configuration of a zoom optical system ZL (ZL1) according to Example 1, and a zoom locus thereof from the wide-angle end state (W) to the telephoto end state (T). In the cross-sectional view in FIG. 2, the reference symbols PF1 and PF2 of the diffractive optical element members constituting the diffractive optical element PF, the reference symbol C of the diffractive optical surface, and the shape of the grating grooves, are omitted to simplify the drawing, and only the reference symbol PF of the diffractive optical element is shown.

As illustrated in FIG. 2, the zoom optical system ZL 1 according to Example 1 includes, in order from an object, a first lens group G1 having negative refractive power, a second lens group G2 having positive refractive power, a third lens group G3 having negative refractive power, a fourth lens group G4 having positive refractive power, and a fifth lens group G5 having positive refractive power.

Upon zooming from the wide-angle end state to the telephoto end state, the first lens group G1 moves along a line being concave toward the object, the second lens group G2 moves toward the object, the third lens group G3 moves toward the object and the fourth lens group G4 moves toward the object so that the distance between the first lens group G1 and the second lens group G2 changes, the distance between the second lens group G2 and the third lens group G3 increases, the distance between the third lens group G3 and the fourth lens group G4 decreases, and the distance between the fourth lens group G4 and the fifth lens group G5 increases. The fifth lens group G5 is fixed and does not move upon zooming.

The first lens group G1 includes, in order from the object, a first negative lens L11 which has a meniscus form having a convex surface facing the object, a second negative lens L12 having a biconcave form, and a positive lens L13 having a meniscus form having a convex surface facing the object. A close-contact multi-layer type diffractive optical element PF is disposed on the image side lens surface of the first negative lens L11, and this surface is aspherical.

The diffractive optical element PF is constituted by diffractive optical element members PF1 and PF2, made of two mutually different UV curable resins, are closely bonded, and the bonded surface is the diffractive optical surface C where diffraction grating grooves are formed (see FIG. 1). In this example, the resins, of which refractive indices are shown in [Resin Refractive Index] in the following table, are used as materials constituting the diffractive optical element members PF1 and PF2. The resin refractive index indicates the refractive index after the resin is cured.

The second group G2 includes, in order from the object, a positive lens L21, a cemented lens of a negative lens L22 and a positive lens L23, and a positive lens L24.

The third lens group G3 includes, in order from the object, a cemented lens of a positive lens L31 and a negative lens L32, and a negative lens L33.

The fourth lens group G4 includes, in order from the object, a cemented lens of a negative lens L41 and a positive lens L42, and a negative lens L43. The object side lens surface of the negative lens L41 is aspherical.

The fifth lens group G5 is constituted by a cemented lens of a positive lens L51 and a negative lens L52 which are disposed in order from the object.

In this example, a stop SP is disposed on the object side of the third lens group G3. Upon zooming, the stop SP moves in tandem with the third lens group G3 from the wide-angle end state to the telephoto end state.

Table 1 shows each data value of the zoom optical system ZL1 according to Example 1. The surface numbers 1 to 30 in Table 1 correspond to each optical surface with the radius of curvatures R1 to R30 in FIG. 2.

TABLE 1

[General Data]

|  | Wide-angle end | Telephoto end |
|---|---|---|
| f = | 24.8~ | 67.8 |
| FNo = | 2.9~ | 2.9 |
| Y = | 21.6~ | 21.6 |
| Σd = | 156.3~ | 141.5 |

[Lens Data]

| Surface number | r | d | nd | νd |
|---|---|---|---|---|
| 1 | 449.276 | 2.88 | 1.65844 | 50.84 |
| 2*a | 26.646 | 0.01 | 1.52780 | 33.41 |
| 3*a*d | 26.646 | 0.01 | 1.55710 | 49.74 |
| 4*a | 26.646 | 14.06 |  |  |
| 5 | −407.787 | 2.10 | 1.60311 | 60.69 |
| 6 | 70.826 | 0.15 |  |  |
| 7 | 53.361 | 5.27 | 1.75520 | 27.57 |
| 8 | 150.738 | D8 (variable) |  |  |
| 9 | 49.742 | 3.58 | 1.66672 | 48.33 |
| 10*a | 220.067 | 9.68 |  |  |
| 11 | 131.177 | 1.80 | 1.71736 | 29.57 |
| 12 | 32.690 | 7.36 | 1.49782 | 82.57 |
| 13 | −179.945 | 8.00 |  |  |
| 14*a | 47.836 | 5.93 | 1.58913 | 61.22 |
| 15 | −186.821 | D15 (variable) |  |  |
| 16*s | ∞ | 1.30 |  |  |
| 17 | 878.033 | 3.50 | 1.86074 | 23.08 |
| 18 | −46.301 | 1.15 | 1.74400 | 44.81 |
| 19 | 75.737 | 2.06 |  |  |
| 20 | −69.602 | 1.20 | 1.74400 | 44.81 |
| 21 | 614.114 | D21 (variable) |  |  |
| 22*a | 53560.956 | 1.30 | 1.74077 | 27.74 |
| 23 | 56.392 | 4.60 | 1.49782 | 82.57 |
| 24 | −37.848 | 0.20 |  |  |
| 25 | 39.729 | 1.40 | 1.76200 | 40.11 |
| 26 | 35.201 | 0.08 | 1.55389 | 39.22 |
| 27*a | 43.244 | D27 (variable) |  |  |
| 28 | 35.707 | 6.00 | 1.58267 | 46.48 |
| 29 | −435.607 | 1.40 | 1.75520 | 27.57 |
| 30 | 68.740 | 41.70 |  |  |

[Aspherical Data]

Surface 2, 3, 4

κ = −1.2845
A4 = 0.322160E−05, A6 = 0.139792E−08,
A8 = −0.270408E−11, A10 = 0.291265E−14
A12 = −0.105112E−17
Surface 10

κ = 73.5073
A4 = 0.252669E−06, A6 = −0.106583E−08,
A8 = 0.272800E−11, A10 = −0.693172E−14
Surface 14

κ = −0.3667
A4 = −0.598146E−06, A6 = −0.228182E−09,
A8 = 0.519056E−13, A10 = −0.809169E−15

TABLE 1-continued

Surface 22

κ = −8.0661e+019
A4 = 0.104993E−04, A6 = −0.463141E−07,
A8 = 0.163623E−09, A10 = −0.311875E−12
Surface 27

κ = 4.1806
A4 = 0.984974E−05, A6 = −0.381469E−07,
A8 = 0.609092E−11, A10 = 0.292963E−1
A12 = −0.120149E−14

[Diffractive Optical Surface Data]

Surface 3

C2 = 6.8348E−05, C4 = 1.2529E−07, C6 = −8.5928E−11

[Diffractive Optical Element Optical Data]

|  | nC | nd | nF | ng |
|---|---|---|---|---|
| Low refractive index | 1.523300 | 1.527800 | 1.539100 | 1.549100 |
| High refractive index | 1.553800 | 1.557100 | 1.565000 | 1.571300 |

[Each Group Distance Data]

|  | Wide-angle end | Telephoto end |
|---|---|---|
| D8 | 53.42 | 1.08 |
| D15 | 0.15 | 24.41 |
| D21 | 17.19 | 1.00 |
| D27 | 0.50 | 25.94 |

[Zoom Optical System Group Data]

| Group number | First surface of group | Group focal length |
|---|---|---|
| G1 | 1 | −40.58 |
| G2 | 9 | 44.42 |
| G3 | 17 | −54.63 |
| G4 | 22 | 100.66 |
| G5 | 28 | 173.02 |

[Conditional Expression]

Conditional expression (1) ν1p = 27.57 (positive lens L13)
Conditional expression (2) Δ(θg, F) = 0.0112 (positive lens L13)
Conditional expression (3) ν1dave = 46.4
Conditional expression (4) fDOE = −7315.48
Conditional expression (5) |φdoei/φi| = 0.0056
Conditional expression (6) |TK/fw| = 3.63
Conditional expression (7) Pmin = 0.094

As the data in Table 1 shows, the zoom optical system ZL1 according to Example 1 satisfies all of the conditional expressions (1) to (7).

Figure 3:
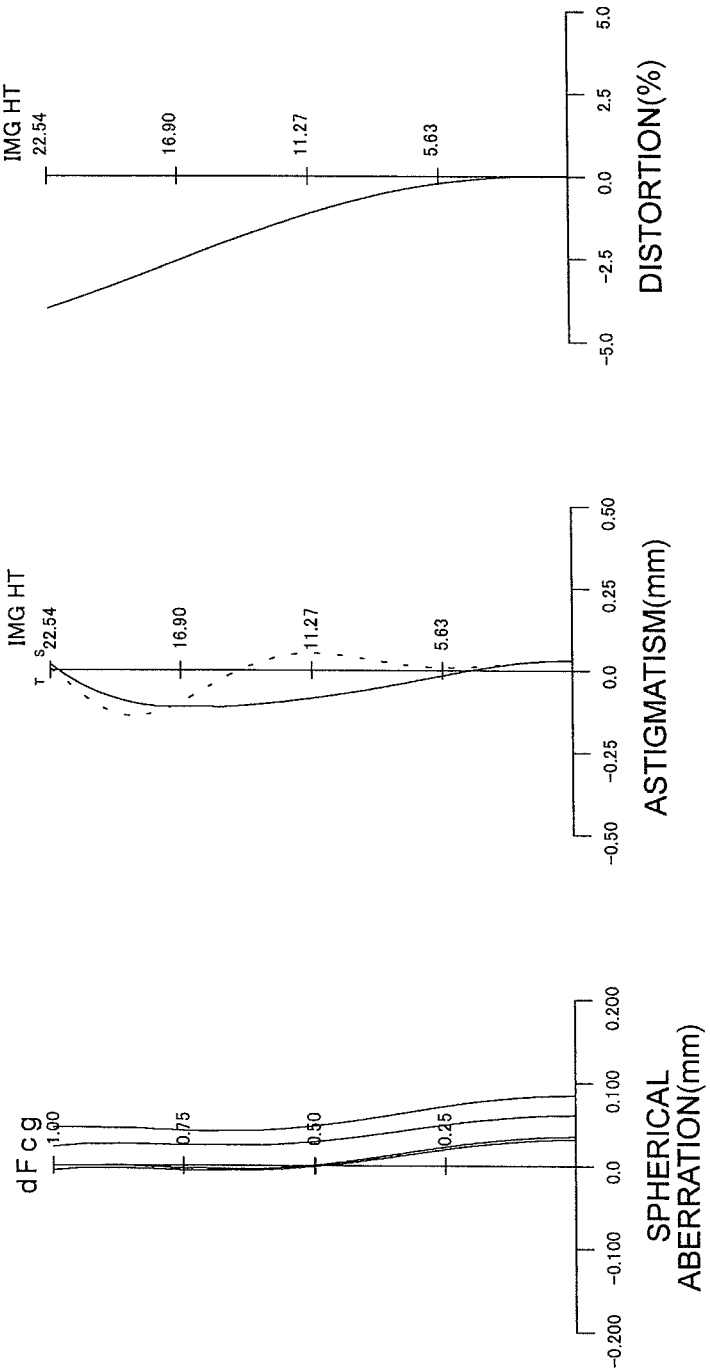
FIG. 3 are graphs showing various longitudinal aberrations of the zoom optical system according to Example 1 upon focusing on infinity in the wide-angle end state.
Figure 4:
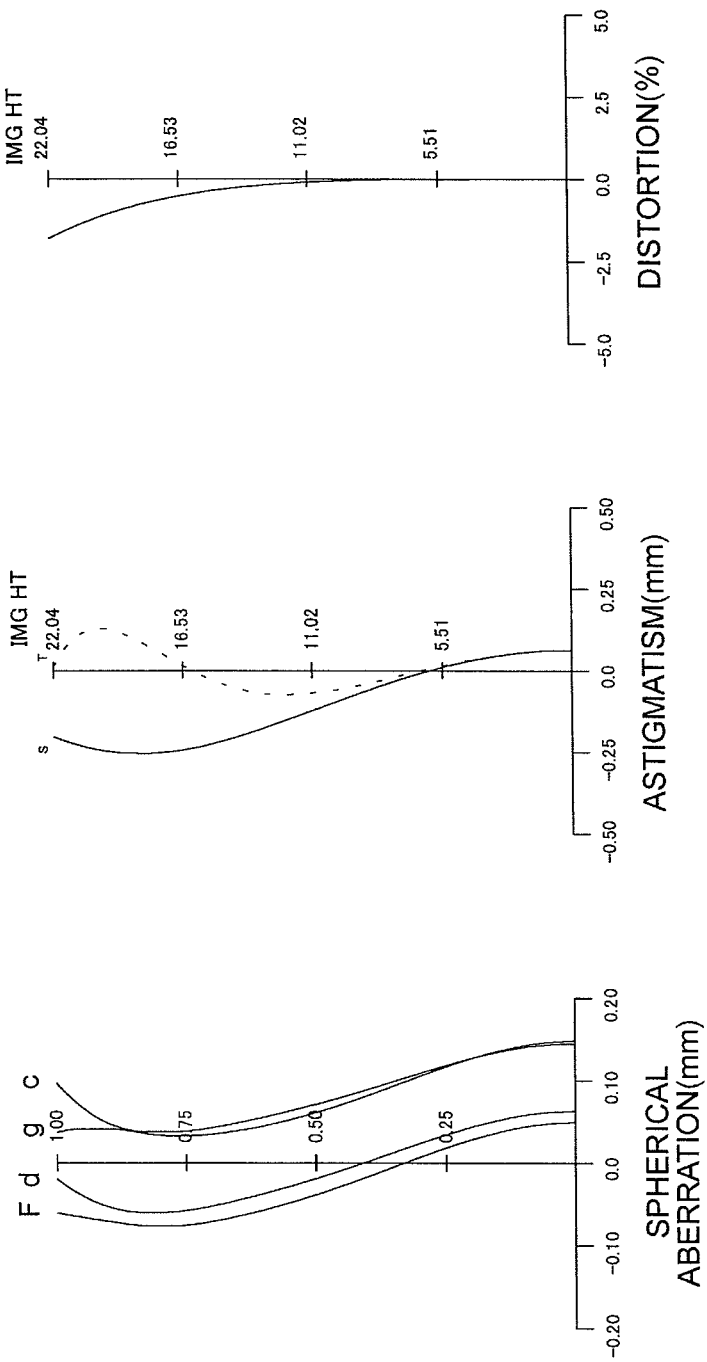
FIG. 4 are graphs showing various longitudinal aberrations of the zoom optical system according to Example 1 upon focusing on infinity in the telephoto end state.

FIG. 3 and FIG. 4 are graphs showing various aberrations of the zoom optical system ZL according to Example 1. FIG. 3 are graphs showing various longitudinal aberrations upon focusing on infinity in the wide-angle end state, and FIG. 4 are graphs showing various longitudinal aberrations upon focusing on infinity in the telephoto end state. In the graphs showing longitudinal aberrations in FIG. 3 and FIG. 4, (longitudinal) spherical aberration, astigmatism and distortion are shown from the left. Each graph showing aberrations was generated by performing ray tracing on the zoom optical system ZL1 according to Example 1 from the object side.

In the graph showing spherical aberration, d, C, F and g denote aberrations at the d-line (wavelength: 587.562 nm), the C-line (wavelength: 656.273 nm), the F-line (wavelength: 486.133 nm) and the g-line (wavelength: 435.835 nm) respectively. In the graph showing spherical aberration, the ordinate is a value normalized assuming the maximum value of the radius of the entrance pupil is 1, and the abscissa is a value of aberration (mm) at each line. The graph showing astigmatism indicates aberrations at the d-line, where the solid line S indicates the sagittal image surface, and the broken line T indicates the meridional image surface. In the graph showing astigmatism, the ordinate is an image height (mm), and the abscissa is a value of aberration (mm). The graph showing distortion indicates aberrations at the d-line. In the graph showing distortion, the ordinate is an image height (mm), and the abscissa is a ratio (%) of the aberration.

The description on the graphs showing aberrations is the same as for other examples, where a same description is therefore omitted.

As each graph showing aberrations clarifies, in the zoom optical system ZL1 according to Example 1, various aberrations, including spherical aberration, astigmatism and distortion, are corrected well in each focal length state from the wide-angle end state to the telephoto end state.

Example 2

Example 2 will be described with reference to FIG. 5 to FIG. 7 and Table 2. FIG. 5 shows a cross-sectional view depicting the configuration of a zoom optical system ZL (ZL2) according to Example 2, and a zoom locus thereof from the wide-angle end state (W) to the telephoto end state (T). In the cross-sectional view in FIG. 5, the reference symbols PF1 and PF2 of the diffractive optical element members constituting the diffractive optical element PF, the reference symbol C of the diffractive optical surface, and the shape of the grating grooves, are omitted to simplify the drawing, and only the reference symbol PF of the diffractive optical element is shown.

As illustrated in FIG. 5, the zoom optical system ZL2 according to Example 2 includes, in order from an object, a first lens group G1 having negative refractive power, a second lens group G2 having positive refractive power, a third lens group G3 having negative refractive power, a fourth lens group G4 having positive refractive power, and a fifth lens group G5 having positive refractive power.

Upon zooming from the wide-angle end state to the telephoto end state, the first lens group G1 moves along a line being concave toward the object, the second lens group G2 moves toward the object, the third lens group G3 moves toward the object and the fourth lens group G4 moves toward the object so that the distance between the first lens group G1 and the second lens group G2 changes, the distance between the second lens group G2 and the third lens group G3 increases, the distance between the third lens group G3 and the fourth lens group G4 decreases, and the distance between the fourth lens group G4 and the fifth lens group G5 increases. The fifth lens group G5 is fixed and does not move upon zooming.

The first lens group G1 includes, in order from the object, a first negative lens L11 which has a meniscus form having a convex surface facing the object, a second negative lens L12 which has a biconcave form, and a positive lens L13 which has a meniscus form having a convex surface facing the object. A close-contact multi-layer type diffractive optical element PF is disposed on the image side lens surface of the first negative lens L11, and this surface is aspherical.

The diffractive optical element PF is constituted by diffractive optical element members PF1 and PF2, made of two mutually different UV curable resins, are closely bonded, and the bonded surface is the diffractive optical surface C where diffraction grating grooves are formed (see FIG. 1). In this example, the resins, of which refractive indices are shown in [Resin Refractive Index] in the following table, are used as materials constituting the diffractive optical element members PF1 and PF2. The resin refractive index indicates the refractive index after the resin is cured.

The second group G2 includes, in order from the object, a positive lens L21, a cemented lens of a negative lens L22 and a positive lens L23, and a positive lens L24.

The third lens group G3 includes, in order from the object, a cemented lens of a positive lens L31 and a negative lens L32, and a negative lens L33.

The fourth lens group G4 includes, in order from the object, a cemented lens of a negative lens L41 and a positive lens L42, and a negative lens L43. The object side lens surface of the negative lens L41 is aspherical.

The fifth lens group G5 is constituted by a positive lens L51.

In this example, a stop SP is disposed on the object side of the third lens group G3. Upon zooming, the stop SP moves in tandem with the third lens group G3 from the wide-angle end state to the telephoto end state.

Table 2 shows each data value of the zoom optical system ZL2 according to Example 2. The surface numbers 1 to 29 in Table 2 correspond to each optical surface with the radius of curvatures R1 to R29 in FIG. 5.

TABLE 2

[General Data]

| | Wide-angle end | Telephoto end |
|---|---|---|
| f = | 24.8~ | 67.8 |
| FNo = | 2.9~ | 2.9 |
| Y = | 21.6~ | 21.6 |
| Σd = | 154.6~ | 156.2 |

[Lens Data]

| Surface number | r | d | nd | vd |
|---|---|---|---|---|
| 1 | 1373.856 | 2.88 | 1.65844 | 50.84 |
| 2*a | 26.403 | 0.01 | 1.52780 | 33.41 |
| 3*a*d | 26.403 | 0.01 | 1.55710 | 49.74 |
| 4*a | 26.403 | 14.04 | | |
| 5 | −339.817 | 2.10 | 1.51742 | 52.20 |
| 6 | 75.213 | 0.15 | | |
| 7 | 58.908 | 7.00 | 1.75520 | 27.57 |
| 8 | 181.498 | D8 (variable) | | |
| 9 | 45.700 | 4.46 | 1.67000 | 57.35 |
| 10*a | 149.654 | 10.23 | | |
| 11 | 120.621 | 1.80 | 1.72342 | 38.03 |
| 12 | 31.386 | 7.76 | 1.49782 | 82.57 |
| 13 | −156.090 | 8.07 | | |
| 14 | 65.708 | 5.13 | 1.62041 | 60.25 |
| 15 | −147.316 | D15 (variable) | | |
| 16*s | ∞ | 1.30 | | |
| 17 | 498.394 | 3.50 | 1.86074 | 23.08 |
| 18 | −41.091 | 1.15 | 1.64769 | 33.73 |
| 19 | 68.531 | 2.82 | | |
| 20 | −41.212 | 1.20 | 1.58267 | 46.48 |
| 21 | 277.500 | D21 (variable) | | |
| 22*a | 39.968 | 1.40 | 1.72825 | 28.38 |
| 23 | 33.184 | 5.49 | 1.49782 | 82.57 |
| 24 | −37.638 | 0.20 | | |
| 25 | −156.917 | 2.13 | 1.67270 | 32.19 |
| 26 | 41.520 | 0.08 | 1.55389 | 39.22 |
| 27*a | 59.020 | D27 (variable) | | |
| 28 | 47.383 | 7.00 | 1.48749 | 70.31 |
| 29 | −2567.589 | 41.80 | | |

TABLE 2-continued

[Aspherical Data]

Surface 2, 3, 4

κ = −1.1680
A4 = 0.182938E−05, A6 = −0.243771E−08,
A8 = 0.736133E−11, A10 = −0.765274E−14
A12 = 0.237652E−17

Surface 10

κ = −10.9723
A4 = 0.226737E−05, A6 = −0.481488E−09,
A8 = 0.133671E−11, A10 = −0.194355E−14

Surface 22

κ = 0.5896
A4 = 0.305972E−05, A6 = −0.407149E−08,
A8 = −0.641264E−10, A10 = 0.108717E−12

Surface 27

κ = 3.1944
A4 = 0.139947E−04, A6 = 0.385271E−07,
A8 = −0.411716E−09, A10 = 0.198530E−11
A12 = −0.440321E−14

[Diffractive Optical Surface Data]

Surface 3

C2 = 4.9111E−05, C4 = 5.4082E−08, C6 = 8.3034E−10
C8 = −2.2413E−12, C10 = 1.6777E−15

[Diffractive Optical Element Optical Data]

| | nC | nd | nF | ng |
|---|---|---|---|---|
| Low refractive index | 1.523300 | 1.527800 | 1.539100 | 1.549100 |
| High refractive index | 1.553800 | 1.557100 | 1.565000 | 1.571300 |

[Each Group Distance Data]

| | Wide-angle end | Telephoto end |
|---|---|---|
| D8 | 49.96 | 2.39 |
| D15 | 0.15 | 31.29 |
| D21 | 14.07 | 1.00 |
| D27 | 0.50 | 31.62 |

[Zoom Optical System Group Data]

| Group number | First surface of group | Group focal length |
|---|---|---|
| G1 | 1 | −41.01 |
| G2 | 9 | 47.18 |
| G3 | 17 | −53.40 |
| G4 | 22 | 115.53 |
| G5 | 28 | 95.52 |

[Conditional Expression]

Conditional expression (1) ν1p = 27.57 (positive lens L13)
Conditional expression (2) Δ(θg, F) = 0.0112 (positive lens L13)
Conditional expression (3) ν1dave = 43.5
Conditional expression (4) fDOE = −10181.00
Conditional expression (5) |φdoei/φi| = 0.0040
Conditional expression (6) |TK/fw| = 3.60
Conditional expression (7) Pmin = 0.055

As the data in Table 2 shows, the zoom optical system ZL2 according to Example 2 satisfies all of the conditional expressions (1) to (7).

Figure 6:
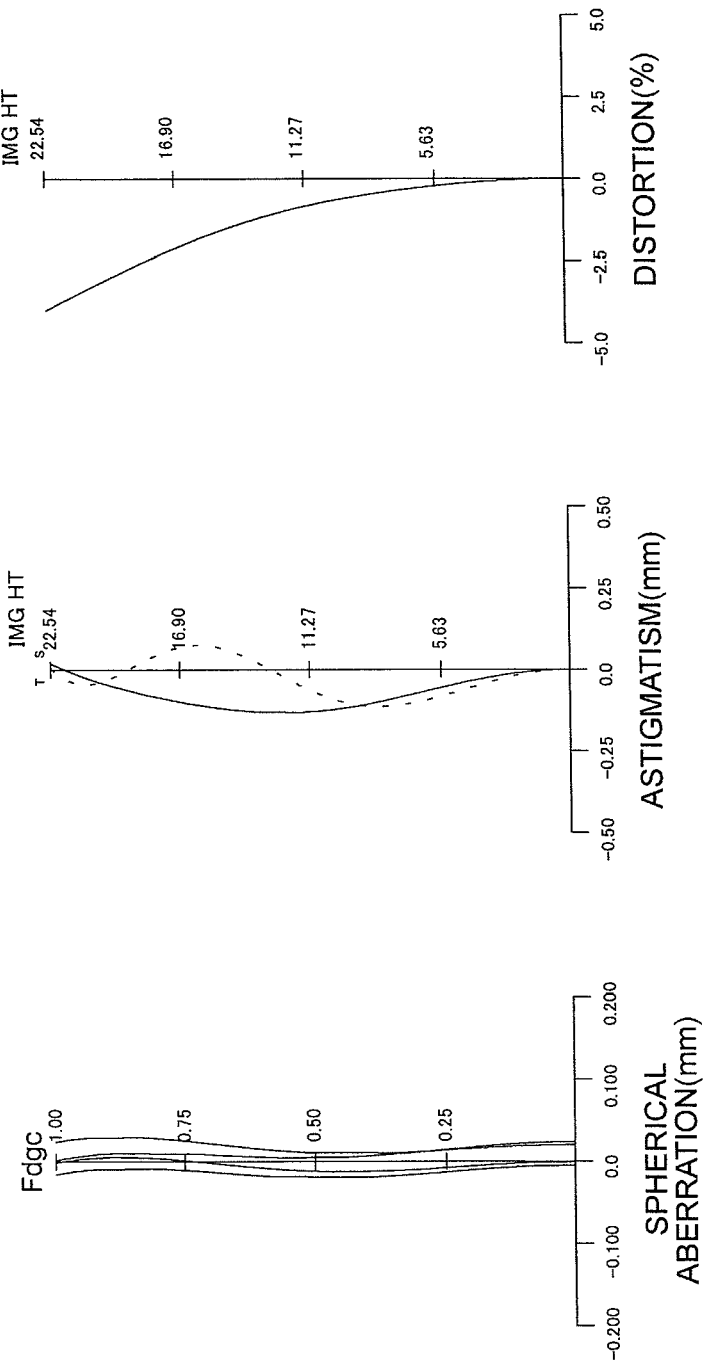
FIG. 6 are graphs showing various longitudinal aberrations of the zoom optical system according to Example 2 upon focusing on infinity in the wide-angle end state.
Figure 7:
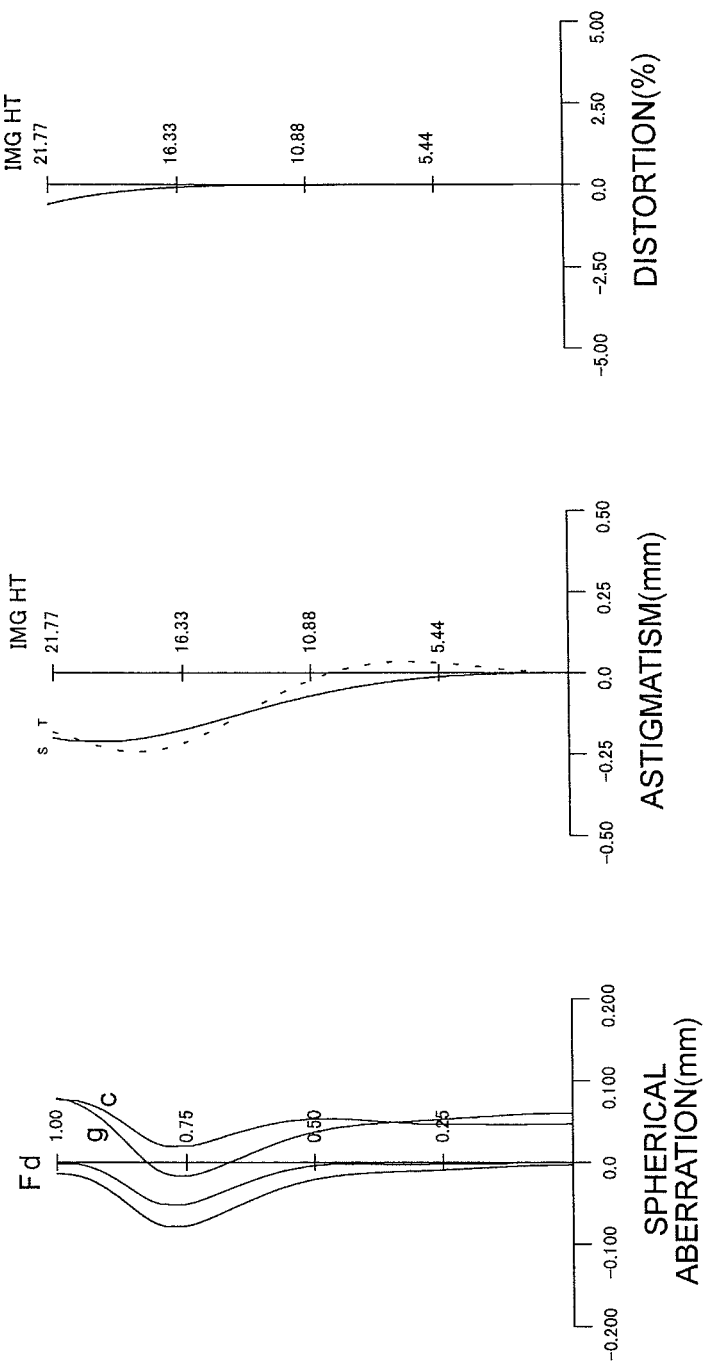
FIG. 7 are graphs showing various longitudinal aberrations of the zoom optical system according to Example 2 upon focusing on infinity in the telephoto end state.

FIG. 6 and FIG. 7 are graphs showing various aberrations of the zoom optical system ZL according to Example 2. FIG. 6 are graphs showing various longitudinal aberrations upon focusing on infinity in the wide-angle end state, and FIG. 7 are graphs showing various longitudinal aberrations upon focusing on infinity in the telephoto end state. In the graphs showing longitudinal aberrations in FIG. 6 and FIG. 7 (longitudinal) spherical aberration, astigmatism and distortion are shown from the left. Each graph showing aberrations was generated by performing ray tracing on the zoom optical system ZL2 according to Example 2 from the object side.

As each graph showing aberrations clarifies, in the zoom optical system ZL2 according to Example 2, various aberrations, including spherical aberration, astigmatism and distortion, are corrected well in each focal length state from the wide-angle end state to the telephoto end state.

Example 3

Figure 8:
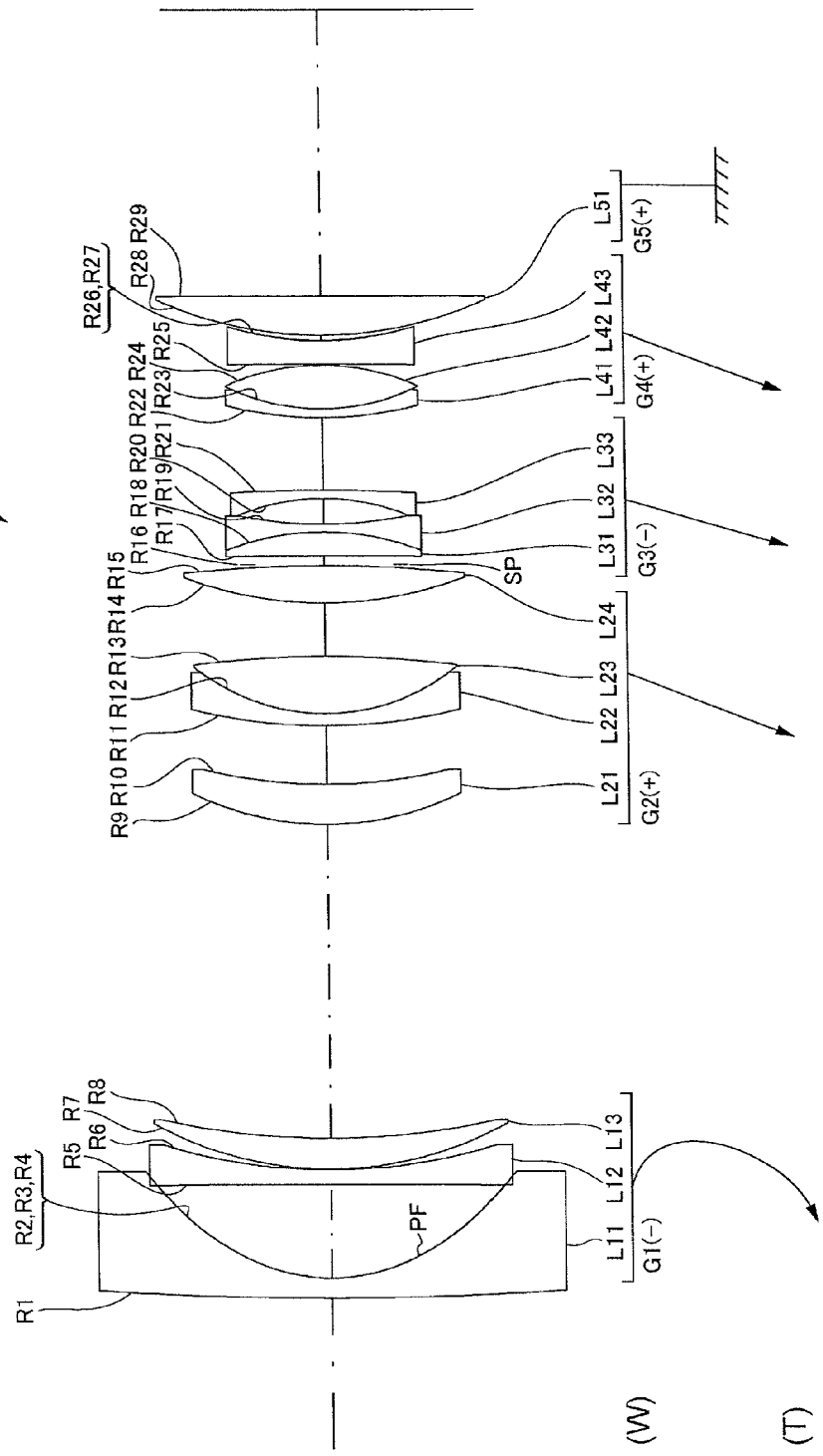
FIG. 8 is a cross-sectional view depicting a configuration of a zoom optical system according to Example 3 in the wide-angle end state, and a zoom locus thereof from the wide-angle end state (W) to the telephoto end state (T)

Example 3 will be described with reference to FIG. 8 to FIG. 10 and Table 3. FIG. 8 shows a cross-sectional view depicting the configuration of a zoom optical system ZL (ZL3) according to Embodiment 3, and a zoom locus thereof from the wide-angle end state (W) to the telephoto end state (T). In the cross-sectional view in FIG. 8, the reference symbols PF1 and PF2 of the diffractive optical element members constituting the diffractive optical element PF, the reference symbol C of the diffractive optical surface, and the shape of the grating grooves, are omitted to simplify the drawing, and only the reference symbol PF of the diffractive optical element is shown.

As illustrated in FIG. 8, the zoom optical system ZL3 according to Example 3 includes, in order from an object, a first lens group G1 having negative refractive power, a second lens group G2 having positive refractive power, a third lens group G3 having negative refractive power, a fourth lens group G4 having positive refractive power, and a fifth lens group G5 having positive refractive power.

Upon zooming from the wide-angle end state to the telephoto end state, the first lens group G1 moves along a line being concave toward the object, the second lens group G2 moves toward the object, the third lens group G3 moves toward the object and the fourth lens group G4 moves toward the object so that the distance between the first lens group G1 and the second lens group G2 changes, the distance between the second lens group G2 and the third lens group G3 increases, the distance between the third lens group G3 and the fourth lens group G4 decreases, and the distance between the fourth lens group G4 and the fifth lens group G5 increases. The fifth lens group G5 is fixed and does not move upon zooming.

The first lens group G1 includes, in order from the object, a first negative lens L11 which has a meniscus form having a convex surface facing the object, a second negative lens L12 which has a biconcave form, and a positive lens L13 which has a meniscus form having a convex surface facing the object. A close-contact multi-layer type diffractive optical element PF is disposed on the image side lens surface of the first negative lens L11, and this surface is aspherical.

The diffractive optical element PF is constituted by diffractive optical element members PF1 and PF2, made of two mutually different UV curable resins, are closely bonded, and the bonded surface is the diffractive optical surface C where diffraction grating grooves are formed (see FIG. 1). In this example, the resins, of which refractive indices are shown in [Resin Refractive Index] in the following table, are used as materials constituting the diffractive optical element members PF1 and PF2. The resin refractive index indicates the refractive index after the resin is cured.

The second group G2 includes, in order from the object, a positive lens L21, a cemented lens of a negative lens L22 and a positive lens L23, and a positive lens L24.

The third lens group G3 includes, in order from the object, a cemented lens of a positive lens L31 and a negative lens L32, and a negative lens L33.

The fourth lens group G4 includes, in order from the object, a cemented lens of a negative lens L41 and a positive lens L42, and a negative lens L43. The object side lens surface of the negative lens L41 is aspherical.

The fifth lens group G5 is constituted by a positive lens L51.

In this example, a stop SP is disposed on the object side of the third lens group G3. Upon zooming, the stop SP moves in tandem with the third lens group G3 from the wide-angle end state to the telephoto end state.

Table 3 shows each data value of the zoom optical system ZL3 according to Example 3. The surface numbers 1 to 29 in Table 3 correspond to each optical surface with the radius of curvatures R1 to R29 in FIG. 8.

TABLE 3

[General Data]

| | Wide-angle end | Telephoto end |
|---|---|---|
| f = | 24.8~ | 67.6 |
| FNo = | 2.9~ | 2.9 |
| Y = | 21.6~ | 21.6 |
| Σd = | 146.4~ | 157.1 |

[Lens Data]

| Surface number | r | d | nd | vd |
|---|---|---|---|---|
| 1 | 541.278 | 2.88 | 1.62041 | 60.25 |
| 2*a | 24.918 | 0.01 | 1.52780 | 33.41 |
| 3*a*d | 24.918 | 0.01 | 1.55710 | 49.74 |
| 4*a | 24.918 | 13.66 | | |
| 5 | −1884.105 | 2.10 | 1.56384 | 60.71 |
| 6 | 82.335 | 0.15 | | |
| 7 | 52.740 | 4.44 | 1.68893 | 31.16 |
| 8 | 111.258 | D8 (variable) | | |
| 9 | 42.908 | 5.90 | 1.74000 | 44.81 |
| 10*a | 78.686 | 8.56 | | |
| 11 | 78.465 | 1.80 | 1.74950 | 35.25 |
| 12 | 29.201 | 8.42 | 1.49782 | 82.57 |
| 13 | −145.003 | 7.87 | | |
| 14 | 56.224 | 5.44 | 1.65100 | 56.24 |
| 15 | −185.363 | D15 (variable) | | |
| 16*s | ∞ | 1.30 | | |
| 17 | −833.557 | 3.50 | 1.86074 | 23.08 |
| 18 | −37.536 | 1.15 | 1.64769 | 33.73 |
| 19 | 60.171 | 3.77 | | |
| 20 | −30.999 | 1.20 | 1.54814 | 45.51 |
| 21 | −247.421 | D21 (variable) | | |
| 22*a | 52.989 | 1.30 | 1.54814 | 45.51 |
| 23 | 31.203 | 6.33 | 1.49782 | 82.57 |
| 24 | −33.095 | 0.20 | | |
| 25 | −870.002 | 3.38 | 1.71736 | 29.57 |
| 26 | 46.113 | 0.08 | 1.55389 | 39.22 |
| 27*a | 57.706 | D27 (variable) | | |
| 28 | 57.488 | 5.72 | 1.62041 | 60.25 |
| 29 | −2567.589 | 41.80 | | |

[Aspherical Data]

Surface 2, 3, 4

κ = −1.0548
A4 = 0.196198E−05, A6 = −0.337901E−09,
A8 = 0.506747E−11, A10 = −0.672772E−14
A12 = 0.318737E−17

TABLE 3-continued

Surface 10

κ = −6.4009
A4 = 0.316676E−05, A6 = −0.809020E−09,
A8 = 0.101113E−11, A10 = −0.159292E−148
Surface 22

κ = 0.4590
A4 = 0.134892E−06, A6 = −0.142020E−07,
A8 = −0.182191E−10, A10 = 0.617701E−13
Surface 27

κ = 1.4571
A4 = 0.981089E−05, A6 = 0.110465E−07,
A8 = −0.220627E−09, A10 = 0.120511E−11
A12 = −0.275363E−14

[Diffractive Optical Surface Data]

Surface 3

C2 = 5.6215E−05, C4 = 1.6670E−07, C6 = 1.6313E−10
C8 = −9.4388E−13, C10 = 8.2737E−16

[Diffractive Optical Element Optical Data]

| | nC | nd | nF | ng |
|---|---|---|---|---|
| Low refractive index | 1.523300 | 1.527800 | 1.539100 | 1.549100 |
| High refractive index | 1.553800 | 1.557100 | 1.565000 | 1.571300 |

[Each Group Distance Data]

| | Wide-angle end | Telephoto end |
|---|---|---|
| D8 | 45.72 | 2.51 |
| D15 | 0.15 | 23.61 |
| D21 | 10.65 | 0.10 |
| D27 | 0.67 | 41.64 |

[Zoom Optical System Group Data]

| Group number | First surface of group | Group focal length |
|---|---|---|
| G1 | 1 | −40.98 |
| G2 | 9 | 44.40 |
| G3 | 17 | −45.75 |
| G4 | 22 | 95.94 |
| G5 | 28 | 90.71 |

[Conditional Expression]

Conditional expression (1) ν1p = 31.16 (positive lens L13)
Conditional expression (2) Δ(θg, F) = 0.0072 (positive lens L13)
Conditional expression (3) ν1dave = 50.7
Conditional expression (4) fDOE = −8894.42
Conditional expression (5) |φdoei/φi| = 0.0046
Conditional expression (6) |TK/fw| = 3.55
Conditional expression (7) Pmin = 0.076

As the data in Table 3 shows, the zoom optical system ZL3 according to Example 3 satisfies all of the conditional expressions (1) to (7).

Figure 9:
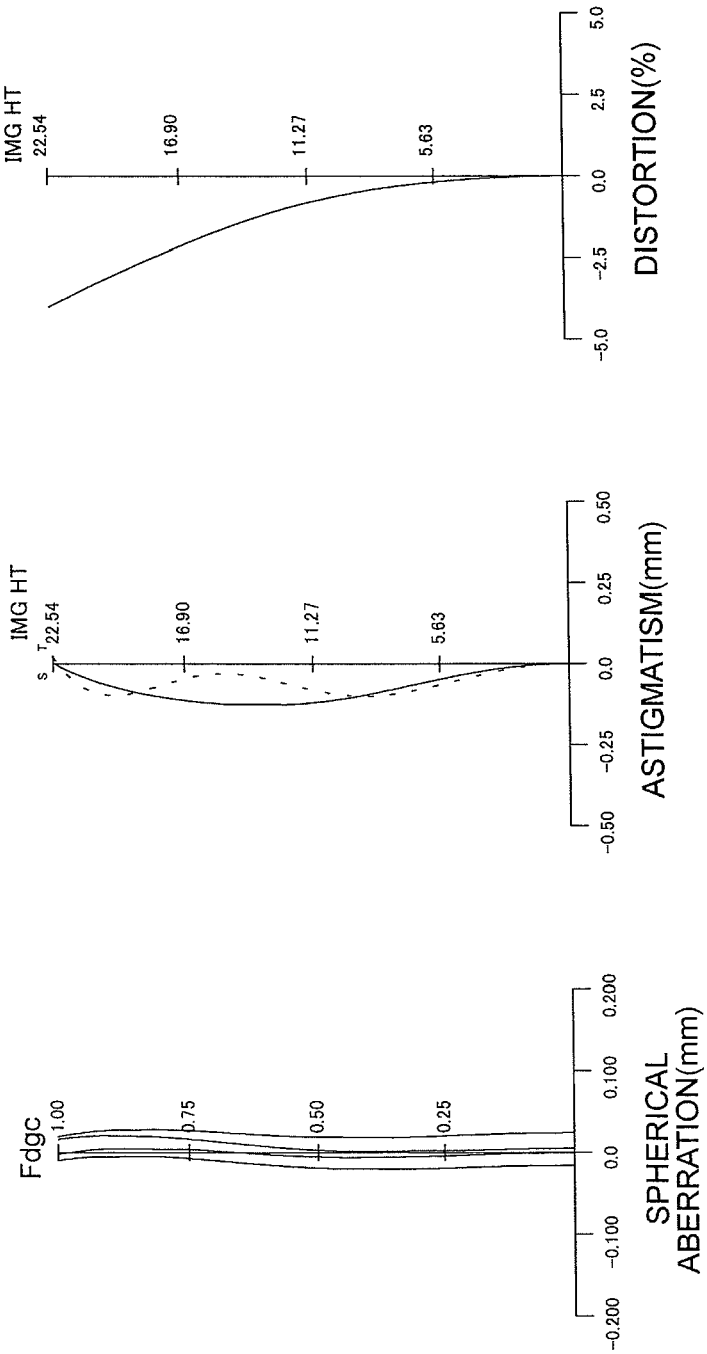
FIG. 9 are graphs showing various longitudinal aberrations of the zoom optical system according to Example 3 upon focusing on infinity in the wide-angle end state.
Figure 10:
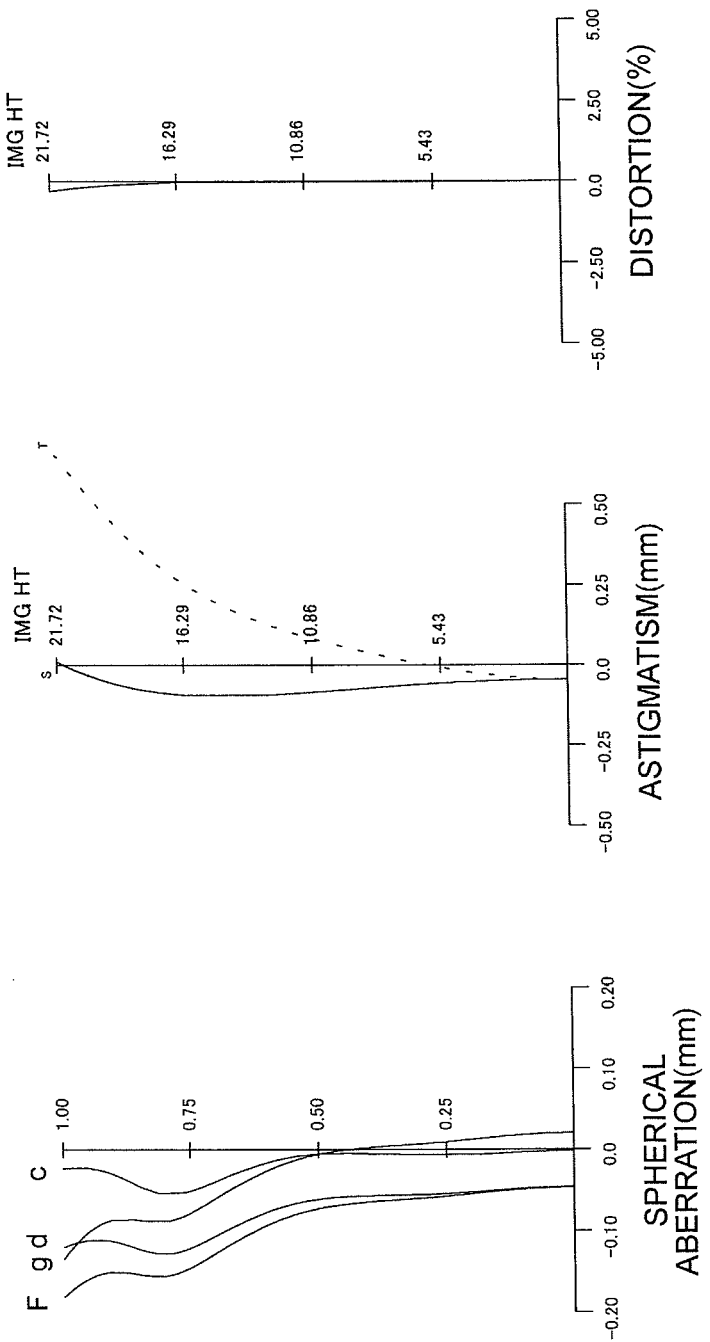
FIG. 10 are graphs showing various longitudinal Aberrations of the zoom optical system according to Example 3 upon focusing on infinity in the telephoto end state.

FIG. 9 and FIG. 10 are graphs showing various aberrations of the zoom optical system ZL according to Example 3. FIG. 9 are graphs showing various longitudinal aberrations upon focusing on infinity in the wide-angle end state, and FIG. 10 are graphs showing various longitudinal aberrations upon focusing on infinity in the telephoto end state. In the graphs showing longitudinal aberrations in FIG. 9 and FIG. 10 (longitudinal) spherical aberration, astigmatism and distortion are shown from the left. Each graph showing aberrations was generated by performing ray tracing on the zoom optical system ZL3 according to example 3 from the object side.

As each graph showing aberrations clarifies, in the zoom optical system ZL3 according to Example 3, various aberrations, including spherical aberration, astigmatism and distortion, are corrected well in each focal length state from the wide-angle end state to the telephoto end state.

As described above, the present invention can provide a zoom optical system which is compact, corrects various aberrations including chromatic aberration well throughout the entire zoom range, has high optical performance, and can be provided by using a diffractive optical element effectively.

Although the embodiments were described with the configuration requirements to clarify the present invention, this does not limit the present invention.

EXPLANATION OF NUMERALS AND CHARACTERS

| ZL(ZL1 to ZL3) | zoom optical system |
|---|---|
| G1 | first lens group |
| G2 | second lens group |
| G3 | third lens group |
| G4 | fourth lens group |
| G5 | fifth lens group |
| PF | diffractive optical element |
| SP | stop |
| CAM | digital single reflex lens camera (imaging apparatus) |
| 1 | imaging lens (zoom optical system) |

The invention claimed is:

1. A zoom optical system which includes, in order from an object, a first lens group having negative refractive power, which is moved upon zooming, a second lens group which is moved upon zooming, a third lens group which is moved upon zooming, and a fourth lens group which is moved upon zooming,
   the first lens group including: in order from the object, a first negative lens, a second negative lens and a positive lens,
   the first negative lens being a meniscus lens with a convex surface toward the object and having a diffractive optical element on an image side lens surface;
   the second negative lens being a bi-concave lens,
   the positive lens being a meniscus lens with a convex surface toward an object, and
   a glass material used for the positive lens satisfying the following conditional expressions:

$v1p \leq 35$ $0.012 > \Delta(\theta g, F) \geq 0.007$ where v1p denotes an Abbe number, based on the d-line, of the glass material, and $\Delta(\theta g, F)$ denotes a deviation of a partial dispersion ratio of the glass material from a standard line that connects a glass type A and a glass type B in a graph of which an abscissa is an Abbe number vd based on the d-line and ordinate is a partial dispersion ratio $(\theta g, F)=(ng-nF)/(nF-nC)$, with the Abbe number vd and the partial dispersion ratio $(\theta g, F)$ of the glass type A and the glass type B being as follows:

Glass type A: $vd=60.49, (\theta g, F)=0.5436$

Glass type B: $vd=36.26, (\theta g, F)=0.5828$ where ng denotes refractive index with respect to the g-line, nF denotes refractive index with respect to the F-line, and nC denotes refractive index with respect to the C-line of the Fraunhofer lines.

2. The zoom optical system according to claim 1, further comprising a fifth lens group which is disposed closer to an image than the fourth lens group, and
   the fifth lens group being kept fixed during zooming.

3. The zoom optical system according to claim 2, wherein the fifth lens group has positive refractive power.

4. The zoom optical system according to claim 1, wherein the second lens group has positive refractive power, the third lens group has negative refractive power, and the fourth lens group has positive refractive power.

5. The zoom optical system according to claim 4, wherein the first lens group includes at least one lens made of a glass material of which an absolute value of refractive power is 1/5000 or less and/or at least one lens made of anomalous dispersion glass of which an Abbe number is greater than 70, which lens is not the diffractive element, wherein the following conditional expression is satisfied:

$40.0 \leq v1dave \leq 55.0$ where v1dave denotes an average value of Abbe numbers of the lenses included in the first lens group, except the diffractive optical element, the lenses of the first lens group made of glass material having the refractive power of 1/5000 or less, and the lenses of the first lens group made of anomalous dispersion glass with Abbe number greater than 70.

6. The zoom optical system according to claim 4, wherein only the third lens group, out of the first lens group to the fourth lens group, includes a lens made of high refractive index glass of which refractive index with respect to the d-line is greater than 1.8.

7. The zoom optical system according to claim 1, wherein the image side lens surface of the first negative lens, on which the diffractive optical element is disposed is aspherical.

8. The zoom optical system according to claim 1, wherein the following conditional expression is satisfied:

$fDOE < -7000$ where fDOE denotes a focal length in mm of the diffractive optical element.

9. The zoom optical system according to claim 1, wherein the following conditional expression is satisfied:

$0.001 \leq |\phi doei/\phi i| 0.010$ where $\phi i$ denotes the refractive power of the entire first lens group including the diffractive optical element, and $\phi doei$ denotes the refractive power of the diffractive optical element.

10. The zoom optical system according to claim 1, wherein
    the following conditional expression is satisfied:

$3.0 < |TK/fw| \leq 4.0$ where TK denotes a minimum value of a distance from an exit pupil of the optical system to an image plane, which changes upon zooming, and fw denotes a focal length of the zoom optical system in a wide-angle end state.

11. The zoom optical system according to claim 1, including
    a fifth lens group that has at least one positive lens and one negative lens.

12. The zoom optical system according to claim 1, wherein
the following conditional expression is satisfied:

$$0.040 \leq Pmin \leq 0.500$$

where Pmin denotes a minimum pitch in mm of the diffractive optical element.

13. The zoom optical system according to claim 1, wherein the second lens group includes at least one aspherical surface.

14. The zoom optical system according to claim 1, wherein the fourth lens group includes at least one aspherical surface.

15. The zoom optical system according to claim 1, wherein an interval between each adjacent pair of lens groups within the zoom optical system changes upon zooming.

* * * * *